Patented Aug. 23, 1949

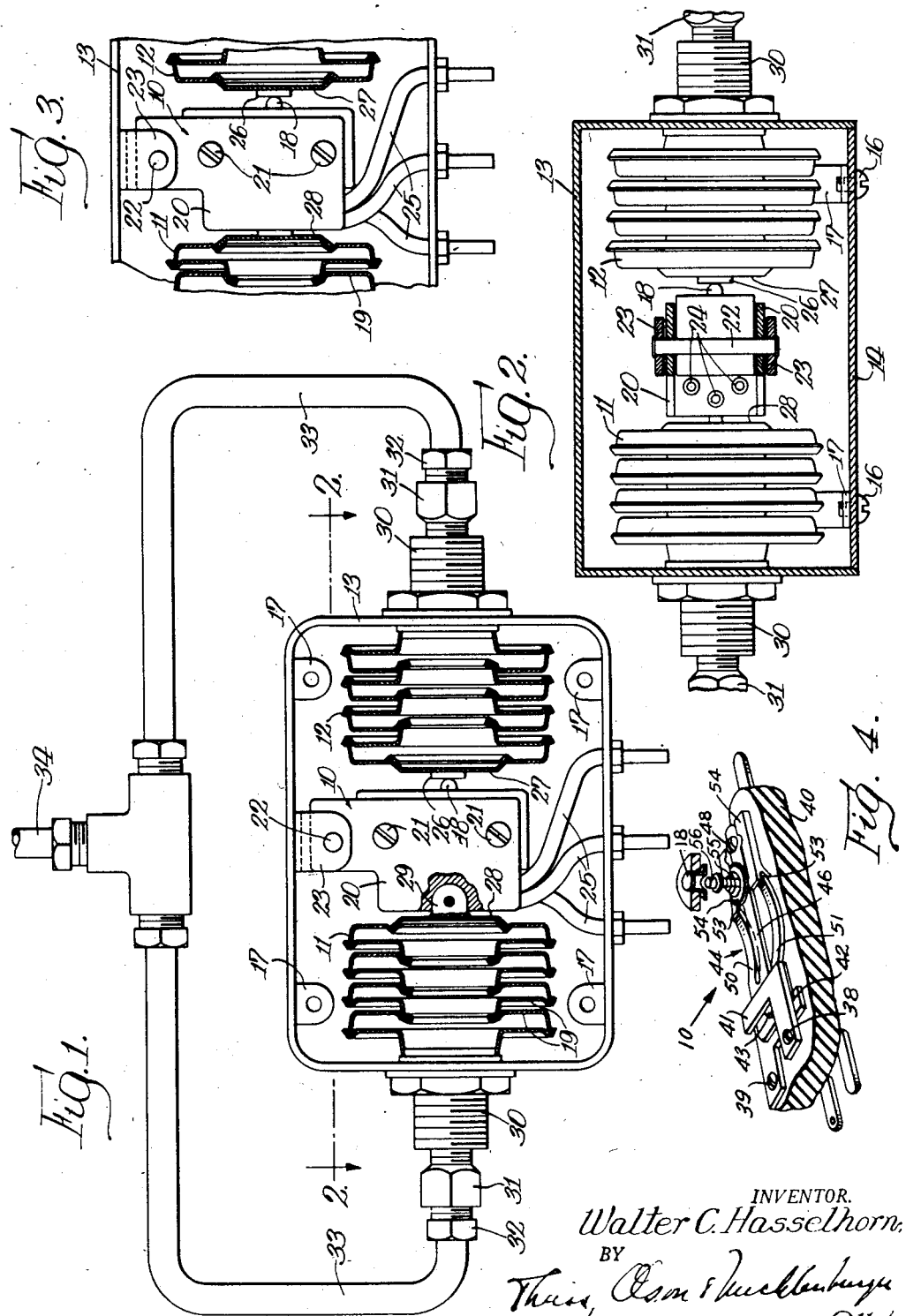

2,479,616

UNITED STATES PATENT OFFICE 2,479,616

SHOCKPROOF HYDROSWITCH

Walter C. Hasselhorn, Chicago, Ill., assignor to Cook Electric Company, Chicago, Ill., a corporation of Illinois Application May 24, 1945, Serial No. 595,555

19 Claims. (Cl. 200—81.5)

This invention relates to pressure switches, and particularly to such switches as may be installed where they are subjected to extreme acceleration at high frequency, such as that due to foreign vibration or the like, or where rapid accelerations of increasing or decreasing velocity are liable to be encountered. Such conditions may be found in aircraft especially where so much is dependent upon the reliable operation of the switches exactly as planned, timed, and intended.

Such devices involve fluid-pressure-responsive means and electric switches. The latter may be of the enclosed, over-center spring type with an operating pin projecting therefrom, which pin is operated by slight pressure, as by the fluid-pressure-responsive means. The fluid-pressure-responsive means may be in the form of bellows which are longitudinally expansive by pressure within. Such devices therefore involve movable operating and co-operating elements, particularly along the line of the operating pin of the switch which it is desired shall be responsive to and operate only when intended by predetermined pressures in the fluid-pressure system with which the devices are connected, and not be influenced by extraneous forces having nothing to do with the operating fluid pressures.

The device may be protected against ill effects and undesired operation from such bodily movements in other than its own operational direction by the rigidity of its construction. But in the operating direction where relatively movable co-operating parts necessarily obtain, the opportunity for such deleterious influences exists. Such switches may be required to be adjusted to extreme sensitivity so as to be operative upon slight variations of pressures and slight movement of the operating pin. A split-second operation may be required. A slight movement of the parts in the operating direction due to vibration or inertia of the parts may be sufficient to operate the switch when not desired, or to prevent its operation when desired, with resulting disastrous consequences.

An object of the present invention is to provide a device of the class described which is shockproof to such objectionable influences and functions properly even though it is subjected to extreme acceleration at high frequency, inertia, or other similar effects.

A further object is the provision of such a device in which the movable operating parts of the fluid-pressure-responsive means and switch may move as a unit in the operational line in response to high accelerations and inertia effects without displacement or disturbance of their relative adjustments so that the device remains normally operative and responsive at all times throughout such influences to pressure changes in the system and only to such pressure changes.

A further object of the invention is the provision of such a device in which the pressure-responsive means is divided and the switch is floatingly or otherwise mounted between the two in proper operative relation therewith, such that the operative parts move in unison under extraneous influences without relative displacement or operation of the switch, but the latter may be operated at any time by the predetermined fluid pressures in the system.

A still further object is the pivotal suspension of a switch between opposed pressure-responsive bellows which are connected to a common source of fluid pressure, whereby less pressure is required to operate the switch and its sensitivity is increased.

Further objects and advantages will appear from the description and claims to follow, in connection with the accompanying drawing, which shows certain embodiments of the invention by way of illustration but not of limitation, and in which—

Fig. 1 is a front elevation of the complete device, with the cover removed from the enclosing casing and the bellows in section;

Fig. 2 is a sectional plan view on the line 2—2 of Fig. 1;

Fig. 3 is a view similar to Fig. 1 but showing the switch merely mounted against the bellows on the left instead of being positively connected thereto, as in Fig. 1; and Fig. 4 is a perspective detail with certain parts broken away to show a typical switch capable of use with the device of Fig. 1.

Referring to these drawings, the electric switch 10 and the operating bellows 11 and 12 on the opposite sides thereof are suitably mounted in and enclosed by a sturdy casing 13 having a removable cover or side 14 which may be tightly secured in position by screws 16 and lugs 17 as indicated.

The switch 10 may be of the well-known over-center spring type, as shown in Fig. 4. See, for example, the switch sold in the trade as the Burgess "Micro-Switch" or Patent No. 1,960,020. This type of switch, which is shown by way of exemplification only, comprises upper and lower fixed contacts 41 and 42, respectively, mounted on the base 40 by screws 38 and 39, the movable contact 43 being adapted to be moved against one or the other of the contacts 41, 42. Movable contact 43 is carried on the resilient member 44 comprising the central link 46 secured to the body 40 of the switch by a screw 48. Over-center spring action is provided by the two integral arcuate tensioned members 50 and 51, the free ends of the latter lying in V-shaped notches 53—53 in the fixed plate 54 and hence deformed into the arcuate contour shown. By properly proportioning the relative lengths of the link 46 and members 50 and 51, a slight movement, on the order of only a few thousandths of an inch, applied to the link 46 suffices to move the contact 43 from one to the other of the fixed contacts 41 or 42. Thus, the switch is of the single-pole double-throw type.

Suitable actuating movement is applied to the link 46 by the button 18, which on being pressed inwardly operates through the washer 54 in contact with the link 46, the coil spring 55, and the shouldered pin 56. This coil spring 55 rests at its lower or inner end on the washer 54 and may be attached thereto. At its upper or outer end the spring 55 engages under the shoulder of pin 56. Thus, although more than the necessary force or pressure to operate the movable switch member is applied to the button 18, the excess movement is absorbed by the coiled spring 55 and the switch cannot be damaged.

The screws 38, 39 and 48, respectively, receive the conductors 25 by means of which the switch may control the external circuit. A pressure on the pin serves to operate the switch contacts, and on release of the pressure the contacts and pin are restored to normal position by the spring action within the switch.

The fluid-pressure-responsive devices 11 and 12 may be and are here shown in the form of bellows, the construction and operation of which are also well known. They comprise a series of ring-like spring metal discs 19 suitably formed, sealed and joined together alternately at their inner and outer peripheries, as by soldering, welding or brazing, whereby to form an expansible resilient chamber responsive to fluid pressure therein to expand axially and to return to or toward normal form and position by its own resilience when the pressure is reduced.

The switch 10 includes side plates 20, preferably of metal, secured to the switch body, as by screws 21, the upper extended ends of which are pivoted, as by rivet pin 22, above the center of gravity of the switch to suitable bracket lugs or ears 23 secured to and extending downwardly from the inside of the adjacent side or top of the enclosing casing or box 13. The switch is thus floatingly supported or carried for its limited movement between the two bellows. The switch is provided with suitable wire terminals 24, in this instance three, in the insulating block or material between the side plates 20, which receive and suitably connect with the ends of flexible conductors 25 to connect the switch in the outside electric circuit controlled thereby. The amount of such insulating material between plates 20 may be varied or be variously weighted, if desired, to cause the switch to hang in the desired position between the bellows.

The bellows 12, adjacent and axially in line with the operating pin 18 of the switch, is provided with a pressure disc 26 secured to or forming a part of its end plate 27, which disc contacts the end of the switch pin 18 when the parts are in normal position, that is, before operation of the switch by pressure. The bellows 11 on the other side of the switch 10, as shown in Fig. 1, has its end plate 28 connected centrally, as by lug 29 and pivot pin, with that side of the switch 10. Or, as shown in Fig. 3, the end plate of the bellows 11 may merely be mounted against the switch normally and not be linked thereto as in Fig. 1.

The outer ends of the bellows are carried by the ends of the casing 13 and are suitably connected thereto and therethrough by well-known connections, as indicated, including the threaded fitting 30 and nipples 31 and 32, to the fluid-pressure pipes or tubes 33 which are connected to the pressure service or system 34, with which the pressure switch is connected for control or other purposes. By means of the fittings 30 the bellows may be adjusted axially in the supporting ends of the casing to suitably position them with respect to the switch 10. They should be so adjusted as normally to engage and lightly press against the switch and pin in balanced relation therewith, so that the switch and the resilient movable parts of the bellows are in balance and float together as a unit without operation of the switch. The two bellows preferably are alike and have like characteristics.

As the parts are thus constructed, arranged and mounted, all operating members move in a right and left operational direction in the position shown and cannot be influenced by high accelerations except in that direction. When, however, high accelerations or inertia effects in that operational direction are applied to the device, both bellows and the switch, if affected thereby, move together as a unit, so that the operating button of the switch is neither compressed further nor released. The switch is operable only by introducing pressure into the tubing, which will expand both bellows and actuate the operating button or pin of the switch; and when this pressure is released, the spring tensions involved allow the operating pin to assume its off position and the parts to assume their balanced unoperated relation.

Since the fluid pressure is applied not only to move the operating pin inwardly but to move the switch body forwardly, that is, to compress the two toward each other, and each moving, say, half the distance required for either alone to operate the switch, and since the expansion of the bellows is a function of the fluid pressure, it is obvious that the less movement of the bellows takes less pressure and therefore that the switch is operative on less pressure than if one of the bellows alone were used. In other words, this device with its double bellows is capable of more sensitive control than with one of the bellows alone.

With this arrangement, too, if the period of acceleration be prolonged, say, to the right toward bellows 12 and then be suddenly slowed, stopped or reversed so that the inertia of switch 10 would tend to swing it forwardly, the connection to bellows 11 would tend to restrain it and the operative parts to be retained in working positions. Likewise, should the accelerations be such as to tend to cause one bellows to expand and the other to contract, the fluid displaced in the one would fill in the other from the communicating tubes 30, so that the normal fluid pressure is maintained in the system whatever the conditions and the device is responsive at all times to any predetermined increase therein to operate the switch. With only extreme accelerations at high frequencies to be guarded against, the arrangement of Fig. 3 suffices to dampen or absorb the same and the bellows and switch to keep and move together as a unit so as not to vary the pressure on the operating pin and the same is operated by any predetermined fluid pressure in the system.

Having thus described the invention and a means for carrying it into effect, and appreciating that various changes and alterations may be made therein without departing from the principle or scope of the invention as set forth in the appended claims, what is claimed and desired to be secured by Letters Patent is:

1. A pressure switch of the class described comprising a pair of opposed fluid-pressure-responsive devices adapted to be subjected to a common fluid pressure, and an electric switch floating between said devices and pivotally connected to one of them and operated by predetermined pressure from said devices, said electric switch and the movable parts of said devices moving together as a unit unchanged in normal operative relationship when the pressure switch is subjected to bodily accelerations, the electric switch being operative at all times by the predetermined pressures of the fluid pressure independently of the influences of such accelerations.

2. A pressure switch of the class described comprising two opposed fluid-pressure spring bellows adapted to be subjected to a common fluid pressure and expansible toward each other, and an over-center spring electric switch floatingly supported between and in operative relation with said bellows, said bellows and switch moving together as a unit without change of normal operative relationship when influenced by bodily accelerations of the pressure switch, whereby the electric switch may be operated at any time by pressure from said source independently of said bodily movements of the pressure switch.

3. A pressure switch of the class described comprising two opposed fluid-pressure-responsive spring bellows expansible toward each other under pressure and an over-center spring electric switch pivoted to hang between said bellows with its operating pin in axial alignment therewith, the movable operative parts of said bellows and said switch being affected alike by accelerating bodily movements of the pressure switch whereby the electric switch is not operated thereby, said electric switch being operated at any time by predetermined pressure in the bellows independently of said accelerating influences.

4. A pressure switch of the class described comprising two opposed fluid-pressure-responsive spring bellows expansible toward each other under pressure and an over-center spring electric switch pivoted to hang between said bellows with its operating pin in axial alignment therewith, said bellows normally engaging said switch on the one side and its operating pin on the other and movable together as a unit without operating the electric switch under the influence of bodily accelerations of the pressure switch, said bellows being responsive to predetermined fluid pressure therein to compress said electric switch and pin to operate the switch independently and despite the presence of said influences.

5. A pressure switch of the class described comprising an enclosing casing, two opposed fluid-pressure-responsive spring bellows secured in said casing and adapted to be subjected to a common fluid pressure, an over-center spring electric switch suspended in the casing between the bellows with its operating push-pin in axial alignment with the bellows and against one of them, the other bellows engaging the other side of the switch, whereby when the bellows are operated by predetermined fluid pressure the switch and pin are compressed together and the switch is operated, the said switch and movable parts of the bellows moving together as a unit without relative displacement under the influence of accelerating movements to which the pressure switch may be subjected, whereby the operation of the switch by fluid pressure is independent of such influence.

6. A pressure switch of the class described comprising an enclosing casing, two opposed fluid-pressure-responsive spring bellows secured to opposite walls of the casing, fluid-pressure connections to said bellows through said walls to be connected to a common fluid pressure, and an over-center spring electric switch swingingly suspended from a wall of the casing and hanging between the free ends of said bellows in position to be engaged thereby on its operating pin and on the opposite side, the free ends of said bellows and switch being in balanced engagement to move together as a unit under the influence of bodily movements of the casing without operating the switch, and said switch being operative at all times by predetermined fluid pressures in the bellows despite such movements of the bellows switch and casing.

7. A pressure switch of the class described comprising a pair of bellows opposing each other to be subjected to a common fluid-pressure, and an over-center spring electric switch floatingly supported between them, one of said bellows being connected to one side of the switch and the other bellows engaging the operating pin thereof, said connection of the bellows with the switch preventing separation thereof due to inertia effects in the movement of the pressure switch as a whole, and said switch being operative at any time by predetermined fluid pressure in the bellows.

8. A pressure switch of the class described comprising a pair of bellows opposing each other to be subjected to a common fluid-pressure, and an over-center spring electric switch floatingly supported between them, one of the bellows engaging the back of the switch and the other the operating pin of the switch on the opposite side thereof, said switch and bellows moving together as a unit under the influence of bodily accelerations of the pressure switch as a whole without operation of the electric switch, and said electric switch being operative at all times by predetermined fluid pressure in the bellows.

9. A pressure switch comprising opposed fluid-pressure-responsive devices and an electric switch between them, said electric switch being mounted to float between said devices and movably connected to one of them and engaged by the other and to be operated by being squeezed therebetween when a predetermined fluid pressure is applied to said devices.

10. A pressure switch comprising an over-center spring-type electric switch having an operating pressure pin projecting therefrom, said switch being floatingly mounted and capable of slight bodily movement to and fro in the direction of the pin, and a pressure-responsive device operative on each side of said switch and in the line of the pin, one of said devices being connected to the adjacent side of the switch, whereby the switch is operated by pressure from said devices on both switch and pin.

11. A pressure switch comprising an over-center spring electric switch having its operating pin projecting at one side, and two fluid-pressure-responsive devices, one on either side of said switch, said switch being suspended between said devices, one engaging the side of the switch and the other the said pin, said devices being adapted to be connected to a common source of fluid pressure, whereby to operate the switch by simultaneous pressure in both devices and corresponding movement of both switch and pin.

12. A pressure switch comprising two opposed fluid-pressure-responsive spring bellows expansible toward each other under pressure, and an over-center spring electric switch floatingly supported between said bellows with its operating pin in axial alignment therewith, said bellows operatively engaging said switch on one side and the pin on the other when subjected to predetermined pressures to operate said switch.

13. A pressure switch comprising two opposed fluid-pressure-responsive spring bellows fixedly supported at their outer ends, and an electric switch flexibly supported between the free ends of said bellows and operated by the squeezing pressure thereof on the opposite sides of the switch when the bellows are subjected to fluid pressure, one of said bellows being hingedly connected to said switch.

14. A pressure switch comprising two opposed fluid-pressure-responsive spring bellows, and an electric switch between them, said switch being operated by squeezing the same by and between said bellows when a predetermined fluid pressure is admitted thereto.

15. A pressure switch comprising two opposed fluid-pressure-responsive spring bellows axially adjustable in supports at their outer ends, and an over-center spring electric switch suspended between the adjacent ends of said bellows, said switch having an operating pin in position to be operated by one of the said bellows, the switch body itself being engageable by the other bellows, said bellows being connectable to a common source of fluid pressure to receive substantially the same pressure in each, whereby when the bellows are operated thereby the switch and pin are pressed together to operate the same.

16. A pressure switch comprising an elongated enclosing casing, a spring bellows in each end of the casing and adjustably fixed and supported at its outer end in the end wall of the casing, and an over-center spring electric switch suspended from one side of the casing between the adjacent ends of the bellows, one of the bellows engaging the operating pin of the switch and the other engaging the opposite side of the switch, said bellows being constructed for connection with a common source of fluid pressure supply for simultaneous operation on substantially the same pressure against the switch and pin to operate the electric switch.

17. A pressure switch comprising an enclosing casing, opposed spring bellows in alignment therein adjustably fixed at their outer ends and arranged to be connected to a common fluid-pressure source to receive substantially the same pressure, an over-center spring electric switch having a projecting operating pin, side plates secured to the body of the switch and projecting above and at the side of the same opposite the pin, said upward projection being pivoted to a support to suspend the switch between the bellows with its operating pin in line with one of the bellows and to be engaged thereby when the bellows is expanded by fluid pressure, and an insulating base between the side projections of the plates, electric terminals for the switch and outside conductors mounted in said base, and the other bellows engaging the said base, whereby predetermined fluid pressure from the source moves the switch and pin together to operate the switch.

18. A pressure switch unit of the class described adapted to be subjected to bodily accelerations, comprising fluid pressure means and a pivotally mounted electric switch normally engaging the movable parts of said fluid pressure means, said movable parts of said means and said switch moving and acting together as a unit in non-movable relative relation under the influence of such accelerations, and means for changing the pressure in said fluid pressure means, said movable parts of said fluid pressure means having provision for operating said switch upon predetermined fluid pressure changes in said fluid pressure means.

19. A pressure switch unit of the class described adapted to be subjected to bodily accelerations, comprising a pair of fluid-pressure devices and an electric switch floatingly mounted between and operatively engaged by the movable parts of said devices, one of said devices being movably attached to the said electric switch, the movable parts of said devices and said electric switch moving together as a unit in non-movable relative relation under said accelerations, and means for changing the pressure in said fluid pressure devices, said movable parts having provision for operating the said switch at all times on predetermined fluid-pressure changes in said devices.

WALTER C. HASSELHORN.

REFERENCES CITED

The following references are of record in the file of this patent:

UNITED STATES PATENTS

| Number | Name | Date |
|---|---|---|
| 1,847,086 | Gargan | Mar. 1, 1932 |
| 2,031,502 | Powell | Feb. 18, 1936 |
| 2,044,729 | Eggleston et al. | June 16, 1936 |
| 2,119,605 | Snediker | June 7, 1938 |
| 2,174,050 | Willett | Sept. 26, 1939 |